United States Patent
Sacher et al.

(10) Patent No.: US 7,184,584 B2
(45) Date of Patent: Feb. 27, 2007

(54) METHOD FOR QUALITATIVELY EVALUATING MATERIAL

(75) Inventors: Jörn Sacher, Hiddenhausen (DE);
Harald Heinrich Willeke, Paderborn (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 412 days.

(21) Appl. No.: 10/482,159

(22) PCT Filed: Jun. 25, 2002

(86) PCT No.: PCT/DE02/02315

§ 371 (c)(1),
(2), (4) Date: Jan. 5, 2004

(87) PCT Pub. No.: WO03/005290

PCT Pub. Date: Jan. 16, 2003

(65) Prior Publication Data

US 2004/0179724 A1    Sep. 16, 2004

(30) Foreign Application Priority Data

Jul. 5, 2001    (DE) ................ 101 32 589

(51) Int. Cl.
*G06K 9/00* (2006.01)
(52) U.S. Cl. ...................................... 382/141
(58) Field of Classification Search ................ 382/173, 382/141–145
See application file for complete search history.

(56) References Cited

U.S. PATENT DOCUMENTS

| | | | |
|---|---|---|---|
| 4,139,779 A | 2/1979 | Ehrat | |
| 4,143,279 A | 3/1979 | Ehrat et al. | |
| 4,551,760 A | 11/1985 | Bendell | |
| 4,930,009 A | 5/1990 | Shiota | |
| 5,125,037 A | 6/1992 | Lehtonen et al. | |
| 5,331,428 A | 7/1994 | Uffel | |
| 5,524,069 A | 6/1996 | Inoue | |

(Continued)

FOREIGN PATENT DOCUMENTS

DE    26 20 767 C2    1/1986

(Continued)

OTHER PUBLICATIONS

R.W.G. Hunt, "The Reproduction of Colour," Article, Fountain Press (London, England), p. 386-390.

*Primary Examiner*—Joseph Mancuso
*Assistant Examiner*—Hadi Akhavannik
(74) *Attorney, Agent, or Firm*—Jones, Tullar & Cooper, PC

(57) ABSTRACT

A method for qualitatively evaluating material with at least one identification characteristic, whose position can vary within an expectation range designated by tolerance limits, involves the use of at least one illuminating device, at least one photoelectric sensor and an evaluating device. At least one background reference value and at least one mask reference are stored in the evaluating device. The background reference represents the characteristics of a printed image, particularly the gray scale value, in at least one portion which surrounds the identification characteristic. The mask reference represents the geometrical contour of the identification characteristic. During inspection of the printed material, differential image data is found, at least from the expectation range, from the actual image data, and from the background reference value in the evaluating device. The actual position of the identification characteristic is subsequently derived in the evaluating device.

24 Claims, 3 Drawing Sheets

U.S. PATENT DOCUMENTS

| | | | |
|---|---|---|---|
| 5,917,931 A * | 6/1999 | Kunkler | 382/137 |
| 6,057,946 A | 5/2000 | Ikeda et al. | |
| 6,111,261 A | 8/2000 | Bolza-Schunemann et al. | |
| 6,240,218 B1 | 5/2001 | Michael et al. | |
| 6,278,533 B1 | 8/2001 | Takemoto | |
| 6,498,863 B1 * | 12/2002 | Gaidoukevitch et al. | 382/173 |
| 6,539,106 B1 | 3/2003 | Gallarda et al. | |
| 6,819,796 B2 * | 11/2004 | Hong et al. | 382/173 |

FOREIGN PATENT DOCUMENTS

| | | | |
|---|---|---|---|
| DE | 196 13 082 C3 | 10/1999 | |
| DE | 100 00 364 A1 | 7/2000 | |
| EP | 0 891 077 A2 | 1/1999 | |
| EP | 1 028 595 A2 | 8/2000 | |
| JP | 11185039 A | 7/1999 | |
| JP | 11185039 * | 10/1999 | 382/173 |

* cited by examiner

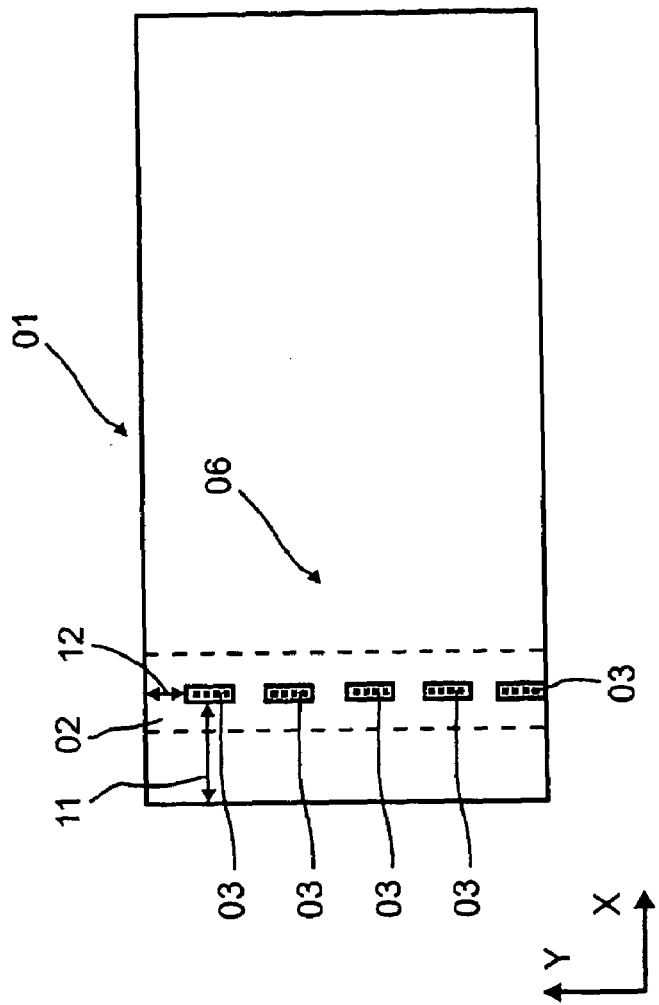
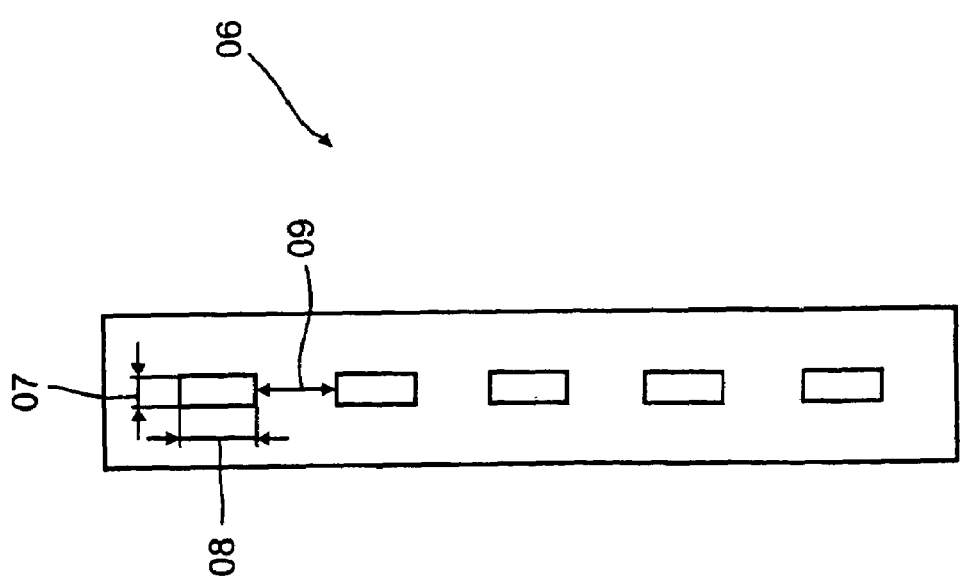

METHOD FOR QUALITATIVELY EVALUATING MATERIAL

CROSS-REFERENCE TO RELATED APPLICATIONS

This application is the U.S. national phase, under 35 USC 371, of PCT/DE02/02315, filed Jun. 25, 2002; published as WO 03/005290 A2 and A3 on Jan. 16, 2003 and claiming priority to DE 101 32 589.4, filed Jul. 5, 2002, the disclosures of which are expressly incorporated herein by reference.

FIELD OF THE INVENTION

The present invention is directed to a method for the qualitative evaluation of material: The material to be evaluated is provided with at least one identification characteristic. The material is typically imprinted material, such as security documents.

BACKGROUND OF THE INVENTION

One prior method for evaluating material is known from DE 196 13 082 C2, for example. In accordance with this prior method, imprinted material, for example sheets imprinted with bank notes or securities provided with a window thread, a hologram or a kinegram, are illuminated by an illumination device in such a way that light reflected by the imprinted material falls into a photoelectric sensor. The image taken by the photoelectric sensor can subsequently be evaluated in an evaluation device, such as, for example a standard computer, with suitable evaluation software, and this image can be checked for printing errors.

Particularly in connection with bank notes, and also in connection with other types of imprinted material, a position of identification characteristics can vary in a defined expected area and within defined tolerance levels because of previous production processes. For example, the position of a window thread in relation to a printed image of bank notes can vary on a printed sheet because of the properties of the production process for producing the window thread. With image-dependent evaluation devices of this type, it is possible that tolerance deviations of defined identification characteristics, which deviations basically are tolerable, can lead to interferences with the printed image inspection. When comparing a faultless printed pattern, such as a master with an actual printed image, one image position after the other image position are compared with each other. Position deviations of identification characteristics are detected as errors, which position deviations are not actually errors. With the method proposed in DE 196 13 082 C2, this problem is solved through the use of suitable illumination steps, so that the identification characteristics, whose positions vary, reflect the light emitted from the illumination device so strongly that these areas are recognized by the electronic evaluation devices because of their high degree of reflection and can be further processed. However, a prerequisite for such an evaluation, in accordance with this prior process, is that the identification characteristics, whose position varies, must have a sufficient reflection capacity. For example these identification characteristics are embodied as silver threads.

It is a limitation of the described prior method that identification characteristics, whose image properties do not sufficiently differ from the image properties of the remaining image, when recorded by a photoelectric sensor, such as is the case with colored window threads, for example, cannot be detected with sufficient dependability by the evaluation device.

DE 100 00 364 A1 describes a method for detecting errors, which is based on characteristics. A mean background level is calculated and is subtracted for amplifying the properties of certain characteristics.

A method for checking the print quality of printed images is known from DE 26 20 767 C2. The partial images resulting from different printing processes are combined into a total pattern.

U.S. Pat. No. 5,125,037 A1 discloses a method for controlling printed images in which additional markers are imprinted. The position and density of these print markers is checked.

It is known from U.S. Pat. No. 6,240,218 to employ projections for accelerating the image comparison method.

JP 11-185039 A describes a method for determining the position of an identification characteristic. A background reference value and a mask reference are stored in an evaluation device. The actual position of the identification characteristic is determined by correlating the reference image with a difference image.

U.S. Pat. No. 5,524,069 discloses a method for separating the foreground and the background of images.

SUMMARY OF THE INVENTION

The object of the present invention is directed to providing a method for the qualitative evaluation of materials.

In accordance with the present invention, this object is attained by storing at least one background reference value and one mask reference in an evaluation device. The background reference value represents the properties of the material to be inspected in at least a part of a surrounding area, which extends around an identification characteristic. The mask reference represents a geometric outline of the identification characteristic. During inspection of the printed material, a difference image is formed from the actual image data and the background reference value. An actual position of the identification characteristic is derived from a comparison of the difference image with the mask reference in the evaluation device. An imprinted reference material, without an identification characteristic, can be employed in a learning phase. A bright identification characteristic can be used.

The invention utilizes the basic concept of letting additional known information regarding the identification characteristics enter the evaluation process in the course of evaluating positionally varied identification characteristics in which the optical properties, for example the ability to reflect, are insufficient for a dependable identification. It is assumed as a premise of the present invention that the positionally varied identification characteristics, for example a colored window thread, differ in their optical properties, for example in their gray scale value, at least in partial areas, from the remaining material to be inspected, for example a printed image, to such an extent, that there is at least no complete agreement between the identification characteristic and the printed image.

An advantage of the present invention lies, in particular, in that additional information regarding the geometric shape, known per se, of the identification characteristic, or the relative arrangement of several identification characteristics existing in the printed image, are evaluated for determining the position of the positionally varied identification characteristic. These additional data are placed into a mask reference, which is stored in connection with every material to be evaluated and which represents the geometric data for that material in a suitable form.

Furthermore, a background reference value is stored in the evaluation device, which background reference value represents the optical properties of the printed image in at least a portion of the area of the printed image surrounding the identification characteristic. The properties of the background reference value must differ, at least slightly, from the optical properties of the identification characteristic to be detected. In the course of an inspection of the imprinted material, a difference image is formed from the actual image data and the background reference value, at least within the expected range. Substantially all of the characteristics of the printed image, which correspond in their optical properties to the background reference value, are blanked out of the difference image by subtraction. Only the area of the positionally varied identification characteristics, as well as other elements, such a printing errors and edge deviations, are shown in the difference image because of their deviation from the background reference value. These areas of the positionally varied identification characteristics have particularly large amplitudes.

As soon as the difference image data are available, the difference image data are compared with the mask reference and with the actual position of the identification characteristic. Conclusions are then drawn regarding the actual position of the identification characteristic from the result of this comparison. This method step is based on the consideration that the difference image is substantially determined by the recording of the positionally varied identification characteristic, so that conclusions can be drawn regarding the actual position of the positionally varied identification characteristic from a large-scale congruence of the mask reference and the difference image. If, because of other error effects, it is not possible to provide a sufficient congruence between the mask reference and the difference image data, the result is harmless, since it merely results in an error indication in the printed image checking and in the removal of the respective sheet.

In accordance with a preferred embodiment of the method of the present invention, the areas of the printed image, resulting from the determination of the actual position of the identification characteristic, are blanked out in the subsequent qualitative evaluation of the imprinted material. Interferences with the inspection of the printed image because of the positionally varied arrangement of the identification characteristic are thus made impossible.

The detection of the positionally varied identification characteristic can moreover be improved by storing a digitizing threshold. After the difference image has been formed from the actual image data and the background reference value, it is possible then to filter all image data, whose values fall below the digitizing threshold, out of the difference image. This means that only such image points or data remain in the difference image which differ with sufficient significance from the normal printed image, so that most of the other deviations, for example printing errors or edge deviations, can be blanked out of the difference image.

In the course of determining the location of the positionally varied identification character in the actual printed image, it is possible to proceed in such a way that the mask reference is shifted until a maximum congruence between the mask reference and the difference image results. It is possible, in the course of this shifting to employ various mathematical weighting methods for weighting the congruence between the mask reference and the difference image, in order to find the appropriate congruence maximum. It is, of course, possible to allow adequately trained personnel to evaluate the congruence by a visual inspection. However, because of the large cost for the personnel and the slow processing speed, this is, in most cases, not sufficiently economical. Therefore, the calculation of the congruence between the difference image and the mask reference should, if possible, take place on the basis of suitable mathematical operations in data form.

One option for evaluating the congruence between the mask reference and the difference image is to calculate concentrations in accordance with an optical distribution of the image points in the difference image, and to compare these concentrations with the concentration of the mask reference. A maximum congruence results if the sum of the focal difference between the mask reference and the difference image is minimized.

The storage of a suitable background reference value in the evaluation device is a prerequisite for performing the method for qualitatively evaluating material, in accordance with the present invention. In principle, the background reference value can be preset simply as a method parameter, based on experimental values. However, it is advantageous if the background reference value is determined, specifically during a learning phase, as a function of the respective printed image of the material to be inspected. Two alternatives for accomplishing this are disclosed.

In accordance with a first alternative for accomplishing a determination of the background reference value, imprinted learning material, which does not contain the positionally varied identification characteristic, is employed in the learning phase. For example, sheets imprinted with securities, and in which sheets the window threads are not contained, can be used for this. The background reference value can be derived by a suitable evaluation of this reference material without identification characteristics.

If a reference material, without an identification characteristic, is unavailable, it is also possible to perform the learning phase using reference material containing the positionally varied identification characteristics. If, in the course of the evaluation of the printed image of the reference material, the positionally varied identification characteristics stand out, in comparison with the surrounding area, by being bright, a threshold value, is selected as the background reference value which threshold value corresponds to the values of the darkest image points of the identification characteristic. In the subsequent evaluation of the imprinted material, it is then assumed, starting with the threshold value, that, at least in the expected area, all image points which are darker than the background reference value are not a part of the positionally varied identification characteristic. If the identification characteristic appears dark, in comparison with the surrounding area, a threshold value is selected as the background reference value whose value corresponds to the brightest image points of the identification characteristic.

To the extent that it is required on the basis of the optical properties of the printed image, it is, of course, possible to define different background reference values for different areas of the imprinted material, so that the positionally varied identification characteristic is represented with sufficient significance in the difference image.

BRIEF DESCRIPTION OF THE DRAWINGS

A preferred embodiment of the present invention is represented in the drawings and will be described in greater detail in what follows.

Shown are in:

FIG. 1, a top plan view of a schematically represented difference image, in

DESCRIPTION OF THE PREFERRED EMBODIMENTS

Figure 1:
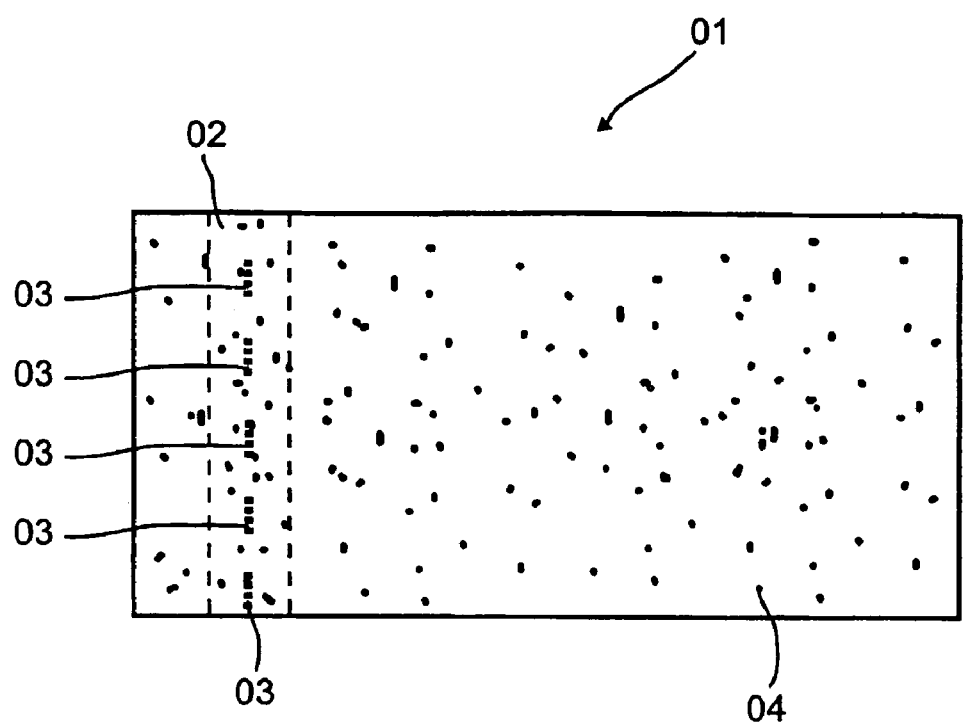

A difference image 01, as depicted in accordance with FIG. 1, is formed during an inspection of sheets imprinted with securities. Only a portion of the difference image 01, in the area of a bank note, is represented in FIG. 1. In FIG. 1 it can be seen that a normal printed image of the bank note is blanked out in the difference image 01, and only the areas of the actual printed image, which significantly differ from a background reference value, are shown as dark fields in the difference image 01. A window thread 03, which has been incorporated into the imprinted sheet is represented in the difference image 01 in five dark fields 03 in accordance with its perforations. A position of this window thread 03 can vary in a strip-shaped area of expectation 02, shown in dashed lines, in the difference image 01 depicted in FIG. 1.

Besides the five dark fields 03 resulting from the representation of the window thread 03, additional printed image characteristics are represented as dark fields 04, for example as printing errors 04, in the difference image 01.

Figure 2:
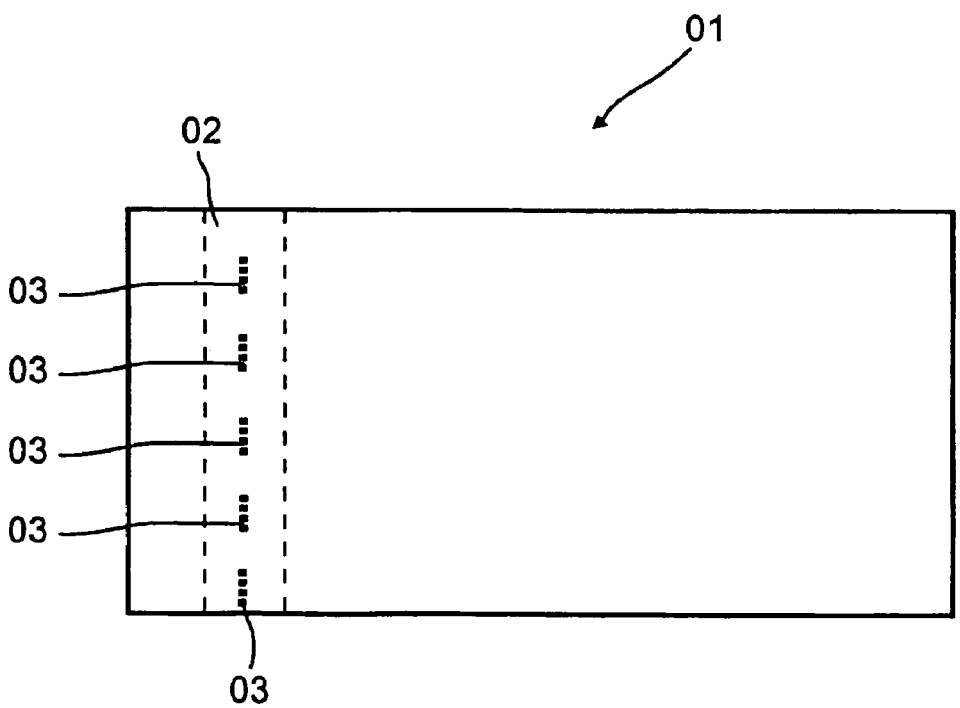
FIG. 2, threshold value a difference image in accordance with FIG. 1 following the performance of a digitizing process, in FIG. 3, a mask reference for use in determining a position of a positionally varied identification characteristic in the difference image in accordance with FIG. 2, in FIG. 4, a congruence of the difference image in accordance with FIG. 2 and the mask reference in accordance with FIG. 3, in FIG. 5, a side elevation view of a schematically represented second mask reference, and in FIG. 6, a side elevation view of a schematically represented second reference image.

FIG. 2 shows the difference image 01 of FIG. 1, after a suitable digitizing process, by which irrelevant dark fields 04 were filtered out. As a result, only the dark fields 03 caused by the window thread 03 appear as significant in the difference image 01.

FIG. 3 represents a mask reference 06 in its geometric shape. Data for a width 07 and for a length 08 of the window thread perforations is stored in the mask reference. Furthermore, values for a distance 09 between the window thread perforations, and the number of such window thread perforations, for each bank note, are stored in the mask reference 06.

As is schematically represented in FIG. 4, in the course of a qualitative evaluation of material in accordance with the present invention, the mask reference 06 is shifted, in relation to the difference image 01, by data-employing operations until a maximum congruence between the mask reference 06 and the dark fields 03 results in the difference image 01. If this maximum of congruence has been reached, it is possible to deduce an actual position of the window thread 03 in the printed image from the distances 11, 12, for example the distances of the actual positions, in the X and Y directions, respectively of the mask reference 06 relative to the edges of the bank note. In the course of a subsequent inspection of the printed image, the areas of the window thread perforations 03 can be blanked out.

Figure 5:
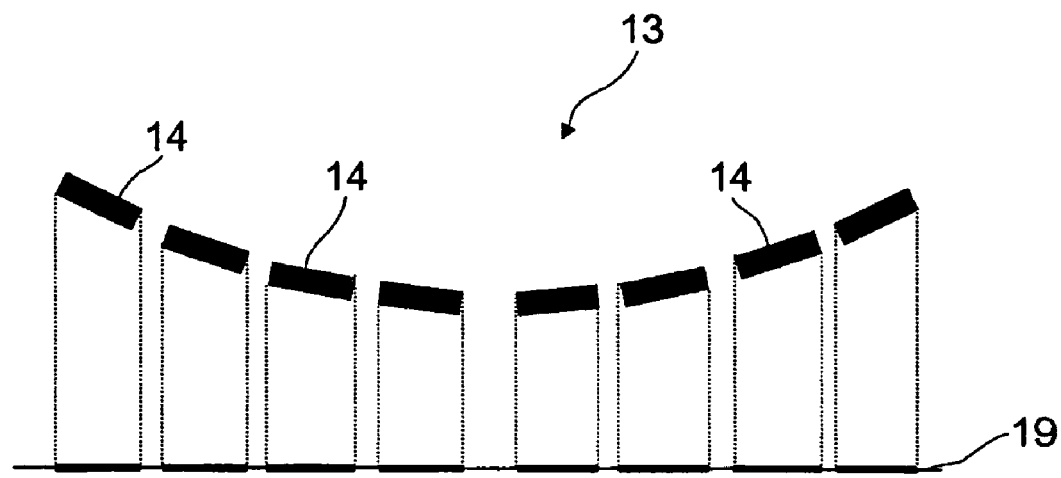

FIG. 5 shows a second mask reference 13, which represents eight dark fields 14. These eight dark fields 14 correspond to eight window thread perforations noted during an inspection on a concavely curved support surface.

Figure 6:
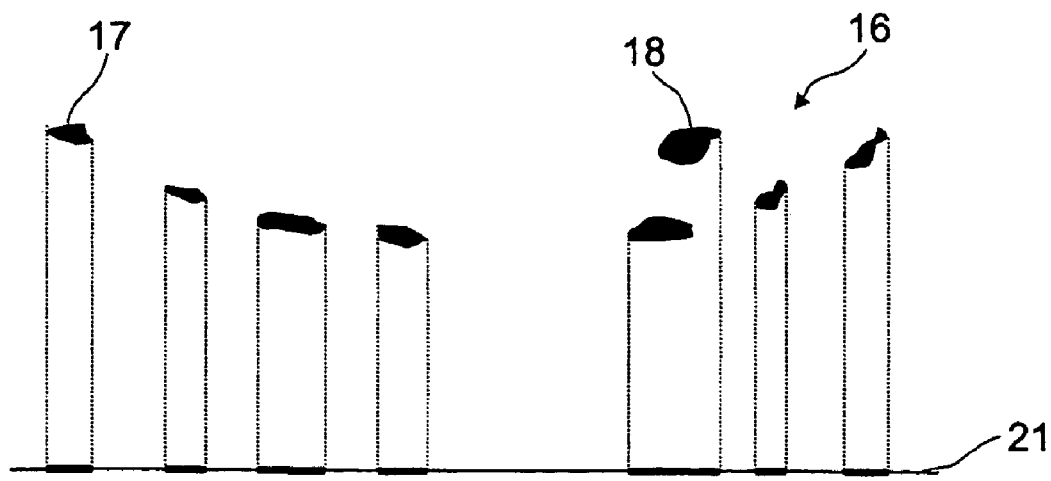

FIG. 6 schematically represents a difference image 18, wherein the window thread perforations 14 have been represented in dark fields 17, for example window threads 17. In this case, the dark field 18 was caused by a printing error 18, and not by a window thread perforation 14. Moreover, a window thread perforation 14 at the center is not represented in the difference image 18 because of an insufficient color difference between the background and the window thread 17.

For simplifying a comparison between the mask reference 13 and the difference image 18 for finding positions, the mask reference 13 is projected onto a projection line 19, and the light-dark distribution resulting therefrom is compared with a light-dark distribution resulting from the projection of the difference image 18 onto the projection line 21. The position of the window thread 17 can be determined in one direction by this one-dimensional comparison of the light-dark distribution.

While preferred embodiments of a method for qualitatively evaluating material, in accordance with the present invention, have been set forth fully and completely hereinabove, it will be apparent to one of skill in the art that various changes in, for example the specific type of material being evaluated, the type of computer programs used to perform the evaluations and the like could be made without departing from the true spirit and scope of the present invention which is accordingly to be limited only by the following claims.

What is claimed is:

1. A method for qualitatively evaluating a material including;

providing at least one identification characteristic on a material to be evaluated;

providing an evaluation device;

determining at least one background reference value representing properties of a material to be evaluated in at least a part of a surrounding area of a material to be evaluated extending around said at least one identification characteristic;

providing at least one mask reference representing one of a geometric outline of said at least one identification characteristic and a relative arrangement of said at least one identification characteristic and a second identification characteristic;

storing said at least one background reference value and said at least one mask reference in said evaluation device;

inspecting a material to be evaluated and determining actual image data of the material to be evaluated;

forming a difference image using said actual image value and said background reference value;

comparing said difference image and said at least one mask reference in said evaluation device and determining an actual position of said identification characteristic of a material to be evaluated; and using said actual position of said identification characteristics and blanking out areas of a material to be evaluated corresponding to said determined location of said actual position of said identification characteristic in a subsequent qualitative evaluation of a material to be evaluated.

2. A method for qualitatively evaluating a material including;
- providing at least one identification characteristic on a material to be evaluated;
- providing an evaluation device;
- determining at least one background reference value representing properties of a material to be evaluated in at least a part of an area of a material to be evaluated extending around said at least one identification characteristic;
- providing at least one mask reference representing one of a geometric outline of said at least one identification characteristic and a relative arrangement of said at least one identification characteristic and a second identification characteristic;
- storing said at least one background reference value and said at least one mask reference in said evaluation device;
- inspecting a material to be evaluated and determining actual image data of the material to be evaluated;
- forming a difference image using said actual image value and said background reference value;
- comparing said difference image and said at least one mask reference in said evaluation device and determining an actual position of said identification characteristic of a material to be evaluated;
- projecting each of said at least one mask reference and said difference image onto at least one projection line; and
- deriving said actual position of said identification characteristic in a linear direction of said projection line by comparing projection data of said mask reference and said difference image.

3. The method of claim 2 further including blanking out an area of a material to be evaluated using said actual position of said identification characteristic in a subsequent evaluation step for the qualitative evaluation of a material to be imprinted.

4. The method of claim 1 further including locating said at least one identification characteristic within an area of expectation defined by tolerance limits.

5. The method of claim 2 further including locating said at least one identification characteristic within an area of expectation defined by tolerance limits.

6. The method of claim 1 further including storing a digitizing threshold in said evaluation unit and filtering out all image data having values lying below said digitizing threshold.

7. The method of claim 2 further including storing a digitizing threshold in said evaluation unit and filtering out all image data having values lying below said digitizing threshold.

8. The method of claim 1 further including shifting said mask reference and determining a maximum congruence between said mask reference and said difference image in response to said shifting of said mask reference.

9. The method of claim 2 further including shifting said mask reference and determining a maximum congruence between said mask reference and said difference image in response to said shifting of said mask reference.

10. The method of claim 8 further including calculating a concentration of an optical distribution of image points of said mask reference and a concentration of an optical distribution of image points of said difference image and comparing said concentrations for determining said maximum congruence.

11. The method of claim 9 further including calculating a concentration of an optical distribution of image points of said mask reference and a concentration of an optical distribution of image points of said difference image and comparing said concentrations for determining said maximum congruence.

12. The method of claim 10 further including determining said maximum congruence when a minimum deviation results from comparing said concentrations of said mask reference and said difference image.

13. The method of claim 10 further including determining said maximum congruence when a minimum deviation results from comparing said concentrations of said mask reference and said difference image.

14. The method of claim 1 further including providing said identification characteristic in a strip shape.

15. The method of claim 2 further including providing said identification characteristic in a strip shape.

16. The method of claim 1 further including embodying said identification characteristic as a security characteristic of a bank note.

17. The method of claim 2 further including embodying said identification characteristic as a security characteristic of a bank note.

18. The method of claim 16 further including selecting said security characteristic as one of a window thread, a perforated window thread, a hologram and a kinegram.

19. The method of claim 17 further including selecting said security characteristic as one of a window thread, a perforated window thread, a hologram and a kinegram.

20. The method of claim 1 further including determining background reference values for different areas of a material to be evaluated.

21. The method of claim 2 further including determining background reference values for different areas of a material to be evaluated.

22. The method of claim 1 further including projecting each of said at least one mask reference and said difference image onto at least one projection line, and deriving said actual position of said identification characteristic in a linear direction of said at least one projection line by comparing projection data of said mask reference and said difference image.

23. The method of claim 1 further including performing an evaluation of a material in said evaluation device using mathematical operations of digitized input data.

24. The method of claim 2 further including performing an evaluation of a material in said evaluation device using mathematical operations of digitized input data.

* * * * *